Aug. 6, 1968     J. P. FAY     3,395,460

EDUCATIONAL DEVICE

Filed May 17, 1966     2 Sheets-Sheet 1

INVENTOR.
James P. Fay
BY
Johnson and Kline
ATTORNEYS

Aug. 6, 1968   J. P. FAY   3,395,460
EDUCATIONAL DEVICE
Filed May 17, 1966   2 Sheets-Sheet 2
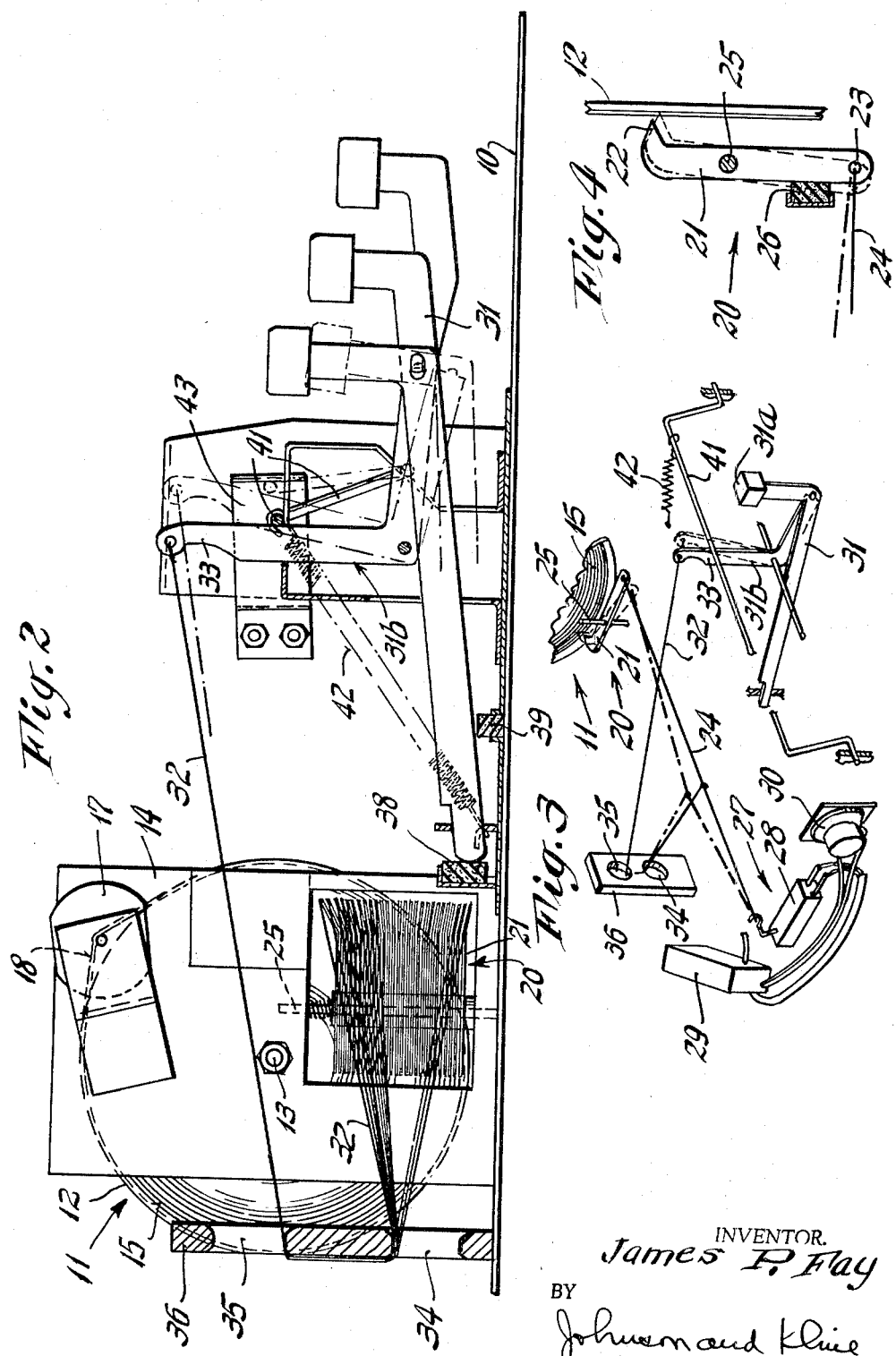
INVENTOR.
James P. Fay
BY
Johnson and Kline
ATTORNEYS United States Patent Office 3,395,460
Patented Aug. 6, 1968

3,395,460
EDUCATIONAL DEVICE
James P. Fay, 18 France St., Norwalk, Conn. 06854
Filed May 17, 1966, Ser. No. 550,688
8 Claims. (Cl. 35—5)

The present invention relates to an instructional device and particularly to an educational device for teaching and correlating the sound of words, letters or the like with corresponding symbols.

Heretofore, instructional devices have been provided which have been of a complicated construction and which have been expensive to manufacture and difficult to operate, particularly by young children.

It is an object of the present invention to provide a simple and relatively inexpensive instructional device which can be readily operated, even by young children, to teach and correlate the sound of words, letters and the like to said children or to persons unfamiliar with the language.

This is accomplished by providing a record with a plurality of separate sound tracks thereon, a pickup for each sound track, a transmission means connecting each pickup to a transducer means for transmitting and converting the signal picked up from the sound track and converting it to an audible signal, a keyboard having symbols corresponding to the recorded sound track, and means connecting the keys of the keyboard to the transmission means so that when a key having a particular symbol is actuated, it will cause the transmission means to become operative to actuate the pickup associated therewith and produce an audible signal corresponding to the symbol on the key.

Other features and advantages of the invention will be apparent from the specification and claims when considered in connection with the accompanying drawings in which:

FIG. 2 is a side view of the present invention.

FIG. 3 is a schematic view of the present invention showing the operation of one key.

FIG. 4 is a detailed view of the pickup means.

Figure 1:
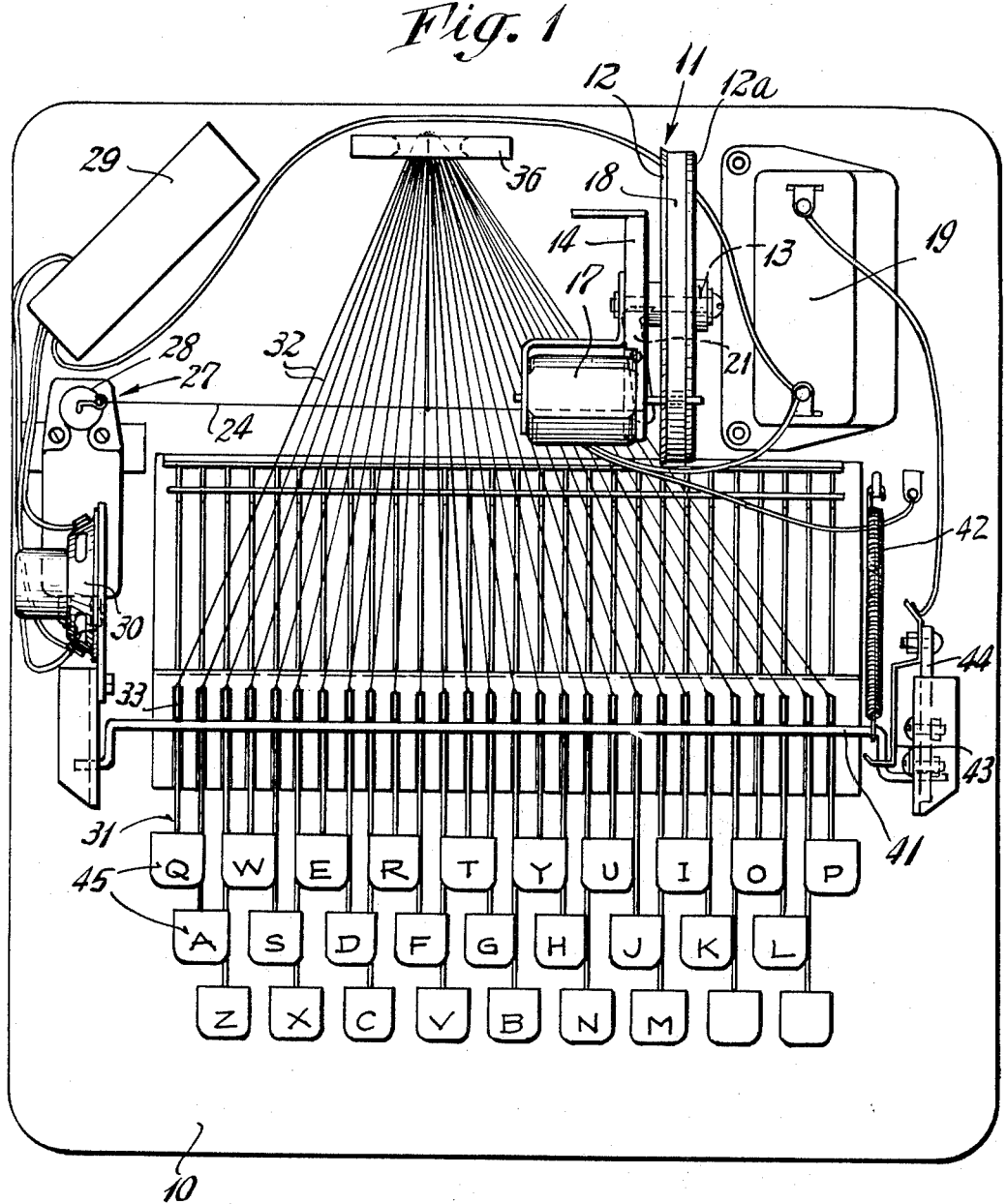
FIGURE 1 is a top view of the device of the present invention.

As shown in the drawings the device of the present invention comprises a base 10 having a record means 11 provided with sound tracks thereon rotatably mounted on the base. While the record means can be a cylinder, tape or the like, in the herein illustrated form of the invention it comprises a disk 12 carried by a carrier 12a rotatably mounted on a shaft 13 carried by a bracket 14 mounted on the base, said disk having a plurality of concentric separate sound tracks 15 recorded thereon. In the preferred form of the invention the sound tracks are cut into the disk with a "hill and dale" cut so as to produce the required sound vibrations for each track. Preferably, the sound is repeated more than once in each track.

The record in the herein illustrated form of the invention is rotated by a small D.C. motor 17 mounted on the bracket 14 and drives a belt or band 18 engaging the edge of the carrier 12a to rotate the same. The motor is energized by a battery 19 mounted on the base.

In accordance with the present invention a pickup device 20 is provided for each sound track. As illustrated, each pickup device comprises a pivoted lever 21 such as shown in FIG. 4 having a sharp pointed end 22 forming a needle at one end adapted to be moved into engagement with the sound track 15 to be vibrated by the recording thereon. The other end of the lever is provided with an aperture 23 to which a vibration transmission filament 24 is connected. This filament is a flexible strand and can be a monofilament or a twisted cord or the like.

The pickup devices are pivotally mounted on a shaft 25 carried by the bracket 14 and a sponge rubber strip or other elastic means 26 is provided to engage all of the pickup devices as shown in FIG. 4 and hold them normally out of contact with the recording grooves.

The transmission filament for each pickup device which has one end connected to the aperture 23 in the end of the needle, as shown in FIGS. 1 and 3, has the other end connected to a transducer means 27. The filament is normally untensioned so that it does not actuate the pickup device, nor is it capable of transmitting any vibrations therealong to the transducer. While the transducer means can be a vibrating diaphragm or the like, in the preferred form of the invention it comprises a usual transducer element or cartridge 28 connected through a suitable electrical amplifying unit 29 receiving energy from the battery 19, to an electrically operated speaker unit 30.

In accordance with the present invention a keyboard (FIG. 1) is provided in which a key unit 31 is provided for each of the filaments. The key unit is connected to the filament by a connector 32 so as to tension the filament and render it operative to cause the pickup device to function to pick up the signal vibrations from the record and also to tension the filament to render it operative to transmit the vibrations to the transducer unit.

In the herein illustrated form of the invention, the keyboard comprises a plurality of units, each having a key 31 provided with an operating head 31a and pivotally mounted on the base and connected to a pivoted L-shaped lever 31b. All of the levers have a common pivotal axis and have an upstanding portion 33 which is moved from a full line position, as shown in FIGS. 2 and 3, to the dot-and-dash line shown therein upon actuation thereof. The connectors 32 are connected to the portion 33 and, in the illustrated form of the invention, comprise a flexible filament secured to the portion 33 and extending therefrom through apertures 34, 35 in a guide block 36 mounted on the base and to a corresponding transmission filament. It will be seen, therefore, that when the key is depressed, it will cause the filament to move to assume the dot-and-dash position of FIG. 3. This will cause the pickup device to be moved against its urging means from normal position and into engagement with the sound track to be actuated thereby and also will cause the filament to become tensioned so as to transmit the vibrations from the pickup device to the transducer means which will convert the vibrations into audible signals.

Preferably, the keys are normally yieldably held in their raised position by reason of their engagement with resilient elements 38, 39, herein illustrated as sponge rubber strips, abutting the rear end and undersurface of the key as shown in FIG. 2.

Also, according to the present invention means are provided for closing the circuit to the motor whenever the keys are operated. As herein illustrated, a pivoted bail 41 is provided which is normally held in retracted position, as shown in FIG. 2, by a resilient spring 42 and is engaged and moved by the end of the portion 33 of the key unit, when it is actuated and moved to tension the transmission line, into engagement with the contact 43 carried by the insulated block 44 and connected in the motor circuit to close the circuit to the motor and cause the record to be rotated. Thus, when the key is pressed down it will produce a corresponding audible sound from the rotating record.

The device, as illustrated, is to be used for teaching the sounds of the alphabet. Accordingly, the head portion 31a of each of the keys is provided with a symbol 45 representing a letter of the alphabet and each sound track which is connected to be actuated by that key is provided with a recording of the sound of the letter so that as the child pushes down on the key he will hear the sound corresponding to the letter of the alphabet as long as the key is depressed and will thus associate the sound and symbol.

Of course, the device can be used to teach words in which case the symbol on the key will be the word and/ or picture of the object corresponding to the word and the sound track will produce the sound of the word.

Thus, it will be seen that the educational device is not only useful for children to learn the alphabet but is capable of teaching them elementary reading and is not limited to use by children but can be used by any person not familiar with the language and desiring to learn the language.

Variations and modifications may be made within the scope of the claims and portions of the improvements may be used without others.

I claim:

1. An educational device comprising a rotating member having a plurality of separate sound tracks recorded thereon, means for rotating said member, a pickup for each sound track responsive to vibrations received from said sound track, a transducer means for producing an audible signal corresponding to the sound vibrations recorded on one of said tracks, an untensioned vibration-transmitting filament connected to each of said pickups and to said transducer, tension means connected to said filament and operable to cause the filament to become taut to cause the pickup actuated by said associated sound track to transmit the sound vibrations along said filament to said transducer means, and operating means for each of the said tension means.

2. The invention as defined in claim 1 wherein the rotating member comprises a disk having concentric annular sound tracks thereon.

3. The invention as defined in claim 1 wherein the sound tracks are cut into the member and the pickup comprises a pivoted needle normally urged to a retracted position, said needle being moved from said retracted position as an incident to the tensioning of the filament and into contact with the sound track to pick up the sound vibrations therefrom.

4. The invention as defined in claim 1 wherein there is a keyboard having a plurality of keys, one connected to each of the tensioning means to operate said tensioning means to tension the filament, and means operated in response to the actuation of any of the keys to control the means for rotating the member having the sound tracks thereon.

5. The invention as defined in claim 1 wherein the means for rotating the member comprises an electric motor, a control switch connected to said motor, and means actuated in conjunction with said operating means for closing the switch and actuating the motor as an incident to the operation of said operating means to tension the filament.

6. The invention as defined in claim 1 wherein the last means includes a pivoted key connected to each of the tension means to operate said tension means upon actuation of the key.

7. The invention as defined in claim 6 wherein the keys are provided with a legend corresponding to the sound track with which it is associated.

8. The invention as defined in claim 1 wherein the transducer means comprises a transducer element, an amplifier connected thereto, and a speaker connected to said amplifier whereby controlled audible signals are obtained.

References Cited

UNITED STATES PATENTS

| 1,326,955 | 1/1920 | Mueller | 274—1.8 |
| 3,112,569 | 12/1963 | Moore et al. | 35—5 |
| 3,136,072 | 6/1964 | Ross | 35—5 |
| 3,264,757 | 8/1966 | Kobler | 35—5 |
| 3,276,144 | 10/1966 | Feldman | 35—5 |
| 3,281,959 | 11/1966 | Kobler et al. | 35—6 |

EUGENE R. CAPOZIO, *Primary Examiner.*

W. W. NIELSEN, *Assistant Examiner.*